(12) United States Patent
Bengtsson (10) Patent No.: US 7,933,596 B2
(45) Date of Patent: Apr. 26, 2011

(54) PROVIDING AND CHARGING FOR DATA SERVICES IN ROAMING NETWORK ENVIRONMENTS

(75) Inventor: Henrik Sven Bengtsson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 826 days.

(21) Appl. No.: 11/862,675

(22) Filed: Sep. 27, 2007

(65) Prior Publication Data
US 2009/0061859 A1 Mar. 5, 2009

Related U.S. Application Data

(60) Provisional application No. 60/969,546, filed on Aug. 31, 2007.

(51) Int. Cl.
*H04W 4/00* (2009.01)
(52) U.S. Cl. ........ 455/433; 455/406; 455/407; 455/408; 455/414.1; 455/432.1; 455/435.1; 455/435.2; 455/435.3; 370/310.1; 370/310.2; 379/114.03; 379/121.02; 379/126; 379/127.05
(58) Field of Classification Search .......... 455/406–408, 455/414.1, 432.1, 433, 435.1, 0.2, 0.3; 370/310, 370/310.2; 379/114.03, 0.1, 0.2–0.25, 0.27–0.28, 379/121.02–121.03, 126–127.05
See application file for complete search history.

(56) References Cited

U.S. PATENT DOCUMENTS

| | | | |
|---|---|---|---|
| 6,167,250 A * | 12/2000 | Rahman et al. | 455/406 |
| 6,970,459 B1 * | 11/2005 | Meier | 370/389 |
| 7,298,725 B2 * | 11/2007 | Rune | 370/338 |
| 7,424,293 B2 * | 9/2008 | Zhu | 455/432.1 |
| 7,633,909 B1 * | 12/2009 | Jones et al. | 370/338 |
| 2002/0193125 A1 * | 12/2002 | Smith | 455/458 |
| 2003/0163577 A1 * | 8/2003 | Moon et al. | 709/229 |
| 2004/0023653 A1 * | 2/2004 | O'Neill | 455/432.1 |
| 2004/0068571 A1 * | 4/2004 | Ahmavaara | 709/228 |
| 2005/0105513 A1 * | 5/2005 | Sullivan et al. | 370/352 |
| 2006/0251229 A1 * | 11/2006 | Gorti et al. | 379/142.02 |
| 2007/0070976 A1 * | 3/2007 | Mussman et al. | 370/351 |

FOREIGN PATENT DOCUMENTS

| | | |
|---|---|---|
| EP | 1 185 118 A1 | 3/2002 |
| EP | 1 492 066 A1 | 12/2004 |
| WO | WO 99/16267 | 4/1999 |
| WO | WO 00/52921 | 9/2000 |

OTHER PUBLICATIONS

Notification of Transmittal of the International Search Report and the Written Opinion of the International Searching Authority, or the Declaration, Jul. 28, 2008, 14 Pages.

* cited by examiner

*Primary Examiner* — Stephen M D'Agosta
(74) *Attorney, Agent, or Firm* — Harrity & Harrity, LLP (57) ABSTRACT

A method provides detecting a roaming operator by a mobile communications device, where the mobile communications device is associated with a home operator; receiving a data service, by the mobile communications device, provided by the roaming operator independent of the home operator; sending information, from the mobile communications device, to the roaming operator for the roaming operator to authenticate the mobile communications device with the home operator; and receiving a voice service, by the mobile communications device, provided by the roaming operator based on the authentication by the roaming operator of the mobile communications device with the home operator.

16 Claims, 10 Drawing Sheets

PROVIDING AND CHARGING FOR DATA SERVICES IN ROAMING NETWORK ENVIRONMENTS

RELATED APPLICATIONS

This patent claims priority to U.S. Provisional Application No. 60/969,546, filed Aug. 31, 2007, which is hereby incorporated by reference.

BACKGROUND

1. Related Field

Embodiments described herein relate generally to providing services in roaming network environments.

2. Description of Related Art

A mobile telephone user may experience "roaming fees" when using a mobile telephone outside his "home" environment, e.g., when he is traveling abroad or anywhere his mobile operator does not provide mobile services. The roaming fees in many instances may be very high and may apply to both voice and data services. In addition, the user may not know what these roaming fees will be until he receives his bill. In particular, a user may be charged per byte of data transmitted or received, a number that may extremely difficult for the user to determine while using a data service, for example. This situation may discourage use of a mobile phone when traveling.

Such billing situations may arise when a user's home operator enters into contracts with mobile operators in areas where the home operator does not provide service, e.g., contracts with "roaming operators." The roaming operator, and sometimes the home operator, may have little incentive to negotiate contracts between each other that would allow simple billing arrangements for customers.

SUMMARY

In one aspect, a method may include detecting a roaming operator by a mobile communications device, where the mobile communications device is associated with a home operator; receiving a data service, by the mobile communications device, provided by the roaming operator independent of the home operator; sending information, from the mobile communications device, to the roaming operator for the roaming operator to authenticate the mobile communications device with the home operator; and receiving a voice service, by the mobile communications device, provided by the roaming operator based on the authentication by the roaming operator of the mobile communications device with the home operator.

In one aspect, detecting a roaming operator may include detecting a group of roaming operators. The method may further include providing to a user of the mobile communications device a list of the group of roaming operators; and receiving a selection of one of the group of roaming operators, where receiving the data service includes receiving the data service from the selected roaming operator.

In one aspect, the method may further include determining whether the roaming operator provides the data service independent of the home operator.

In one aspect, determining whether the roaming operator provides the data service independent of the home operator may include requesting a universal resource indicator (URI) from the roaming operator; and detecting a redirection to a different URI.

In one aspect, the method may further include sending payment information from the mobile communications device to the roaming operator for payment for the data service.

In one aspect, receiving the data service may include receiving a first data service. The method may further include receiving a second data service from the roaming operator, where the roaming operator interconnects with the home operator to provide the second data service.

In one aspect, the second data service may include one of a simple message system (SMS) message or a multi-media message system (MMS) message.

In one aspect, a method may include sending rate information for a data service to a mobile communications device from a roaming operator, where the mobile communications device is associated with a home operator; receiving authentication information from the mobile communications device; authenticating the mobile communications device with the home operator; providing a data service to the mobile communications device by the roaming operator independent of the home operator; and providing a voice service to the mobile communications device by the roaming operator based on the authentication by the roaming operator of the mobile communications device with the home operator.

In one aspect, the method may include receiving a request from the mobile communications device for the rate information for the data service.

In one aspect, the method may include receiving payment information from the mobile communications device for payment for the data service.

In one aspect, the method may include receiving a request for a universal resource indicator (URI) from the mobile communications device; and redirecting the mobile communications to a different URI.

In one aspect, providing the data service includes providing a first data service. The method may further include providing a second data service to the mobile communications device, where the roaming operator interconnects with the home operator to provide the second data service.

In one aspect, the second data service is one of a simple message system (SMS) message or a multi-media message system (MMS) message.

In one aspect, the method may further include determining whether to provide the second data service by interconnecting with the home operator based on a type of the second data service.

In one aspect, a mobile communications device associated with a home operator may include a transceiver to transmit and receive communication signals to and from a roaming operator; and a processor, coupled to the transceiver, to: process a data service from the roaming operator independent of the home operator; provide information to the roaming operator for the roaming operator to authenticate the mobile communications device with the home operator; and process a voice service from the roaming operator based on the authentication by the roaming operator of the mobile communications device with the home operator.

In one aspect, the transceiver receives communication signals from a group of roaming operators. The device may further include a display to provide the user with a list of the group of roaming operators; and a user interface to receive a selection of one of the group of roaming operators, where the processor processes the data service from the selected roaming operator.

In one aspect, the processor may determine whether the roaming operator provides the data service independent of the home operator.

In one aspect, the processor requests a universal resource indicator (URI) from the roaming operator and detects a redirection to a different URI.

In one aspect, the processor sends payment information to the roaming operator for payment for the data service.

In one aspect, the processor receives a second data service from the roaming operator, where the roaming operator interconnects with the home operator to provide the second data service.

In one aspect, the second data service is one of a simple message system (SMS) message or a multi-media message system (MMS) message.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description refers to the accompanying drawings. The same reference numbers in different drawings may identify the same or similar elements. Also, the following detailed description does not limit the scope of the claims. Rather, the claims define the scope of the inventions described herein.

In one or more embodiments described herein, a roaming operator may provide data services to a mobile device independent of the home operator. In one or more embodiments describe herein, the roaming operator may provide data services to the mobile device at a flat rate, e.g., a flat tariff. In one or more embodiments described herein, a roaming operator may pass traffic through a gateway GPRS (general packet radio system) support node (GGSN) rather than sending data back to the home operator through an interconnect between the home operator and the roaming operator. In one or more embodiments described herein, a roaming operator may decide whether to pass traffic through a GGSN or through an interconnect to the home operator.

Figure 1:
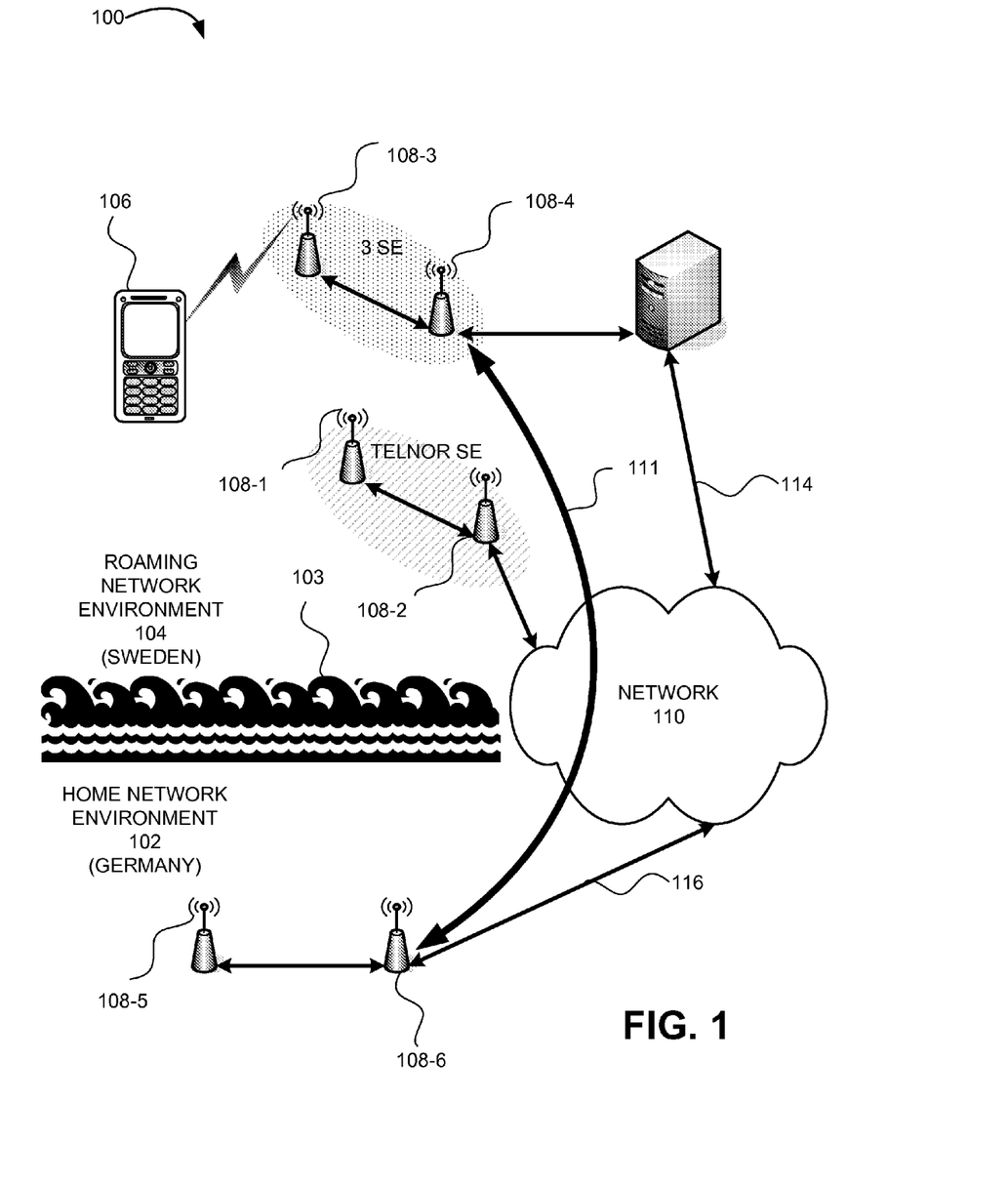
FIG. 1 shows an exemplary environment for embodiments described herein.

FIG. 1 shows an exemplary environment 100 in which embodiments described herein may be implemented. Environment 100 may include a home network environment 102 (e.g., Germany) and a roaming network environment 104 (e.g., Sweden). Home network environment 102 may be separated from roaming network environment 104 by a body of water 103, e.g., the Baltic Sea. Roaming network environment 104 may include a user device 106 (device 106), cell towers 108-1 through 108-4, a server 112, a link 114, and a link 116. Home network environment 102 may include cell towers 108-5 and 108-6. Cell towers 108-1 through 108-6 may be collectively referred to as "cell towers 108" and individually as "cell tower 108-x." Environment 100 may also include a network 110, which may include an interconnect 111 for connecting home network environment 102 and roaming network environment 104. In one embodiment, interconnect 111 may be a dedicated or pre-determined link between a roaming operator and a home operator, e.g., between home network environment 102 and roaming network environment 104.

In other embodiments, environment 100 may include more, fewer, or different components. Moreover, one or more components of environment 100 may perform one or more functions of any other component of environment 100. Furthermore, one or more of device 106, cell towers 108, network 110, and server 112 may be remotely located from each other.

Device 106 may communicate with towers 108 via a wireless communication protocol, e.g., GSM (Global System for Mobile Communications), CDMA (code-division multiple access), WCDMA (wideband code-division multiple access), GPRS, EDGE (enhanced data rates for GSM evolution), etc. Device 106 may include any of the following devices: a mobile telephone; a personal computer; a telephone, such as a radio telephone; a personal communications system (PCS) terminal that may combine cellular radiotelephone with data processing, facsimile, and/or data communications capabilities; an electronic notepad; a personal music player (PMP); a laptop; a personal computer (PC); a personal digital assistant (PDA) that can include a radiotelephone, pager, Internet/intranet access, web browser, organizer, calendar, and a global positioning system (GPS); or another type of computation or communication device. In another embodiment, device 106 may communicate with towers 108 or other devices via a wired network.

Towers 108 may communicate with device 106 using any wireless communication protocol, e.g., GSM, CDMA, WCDMA, GPRS, EDGE etc. Towers 108 may include a device for accessing network 110 or server 112, such as a router, that is able to receive and transmit wireless and/or wired signals, or any other device that provides access to a network. Device 106 may connect to network 110 via any one of towers 108. In other embodiments, device 106 may connect directly to network 110 via wired and/or wireless connections.

Towers 108 may provide mobile telephone and data services to user devices e.g., device 106. Such network services may include voice telephone calls, web browsing, email, etc. One or more network operators may provide such services to device 106. For example, tower 108-1 and 108-2 may belong to one service provider (e.g., Telenor SE™, illustrated in the stripped field in FIG. 1) and towers 108-3 and 108-4 may belong to another service provider (e.g., 3 SE™, illustrated in the dotted field in FIG. 1). When an operator provides services to a device that does not have a pre-existing subscription, the operator may be considered a "roaming operator" with respect to that device.

Network 110 may include the Internet, an ad hoc network, a local area network (LAN), a wide area network (WAN), a metropolitan area network (MAN), a cellular network, a public switched telephone network (PSTN), or any other network or combinations of networks. Network 110 may include interconnect 111, which may provide a link between home network environment 102 and roaming network environment 104. For example, interconnect 111 may provide a pre-determined or dedicated link between the roaming operator using towers 108-3 and 108-4 (e.g., 3 SE) and the home operator using towers 108-5 and 108-6. In one embodiment, interconnect 111 may be any type of data link, including non-dedicated links.

Server 112 may include one or more computer systems or server modules for hosting server programs, databases, and/or applications. Server 112 may include a GGSN, which may act as a gateway between a GPRS wireless data network and other networks, such as network 110. A user of device 106 may make a data request through an application (e.g., a browser) hosted by device 106 and server 112 may satisfy the request by providing a GGSN, e.g., a gateway, to network 110. In other words, a GGSN may provide link 114 between server 112 and network 110. In addition, a GGSN (not shown) in tower 108-6 may provide link 116 between tower 108-6 and network 110.

Exemplary User Device

Figure 2:
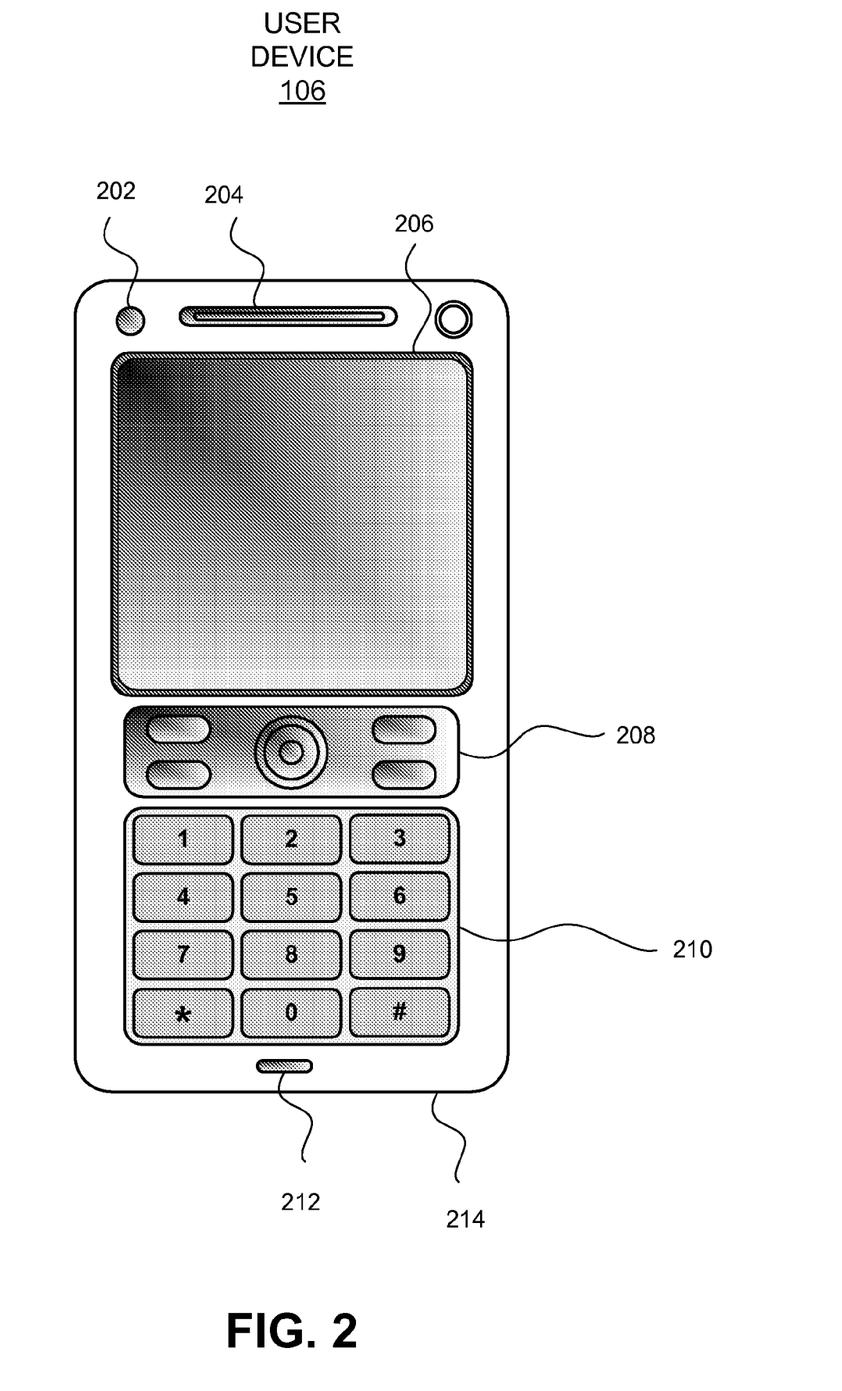
FIG. 2 is an exemplary block diagram of a user device.

FIG. 2 is an exemplary diagram of device 106. As illustrated, device 106 may include a camera 202, a speaker 204, a display 206, control keys 208, a keypad 210, a microphone 212, and a housing 214. Device 106 may include other components (not shown in FIG. 2) that aid in receiving, transmitting, and/or processing data. Moreover, other configurations of components in device 106 are possible. Furthermore, one or more components of client device may be remotely located from each other.

Camera 202 may enable a user to view, capture and store media (e.g., images, video clips) of a subject in front of device 106. Speaker 204 may provide audible information to a user of device 106. Display 206 may include a display screen to provide visual information to the user, such as video images or pictures, and may include a touch screen to accept inputs from a user. For example, display 206 may provide information regarding incoming or outgoing telephone calls, games, telephone numbers, contact information, the current time, e-mail, etc. Control keys 208 may permit the user to interact with device 106 to cause device 106 to perform one or more operations, such as place or receive a telephone call. Control keys 208 may include "soft keys" that may perform the functions indicated on display 206 directly above the keys. Keypad 210 may include a standard telephone keypad and may include additional keys to enable inputting (e.g., typing) information into device 106. Microphone 212 may receive audible information from the user. Housing 214 may provide a casing for components of device 106 and may protect the components from outside elements.

Figure 3:
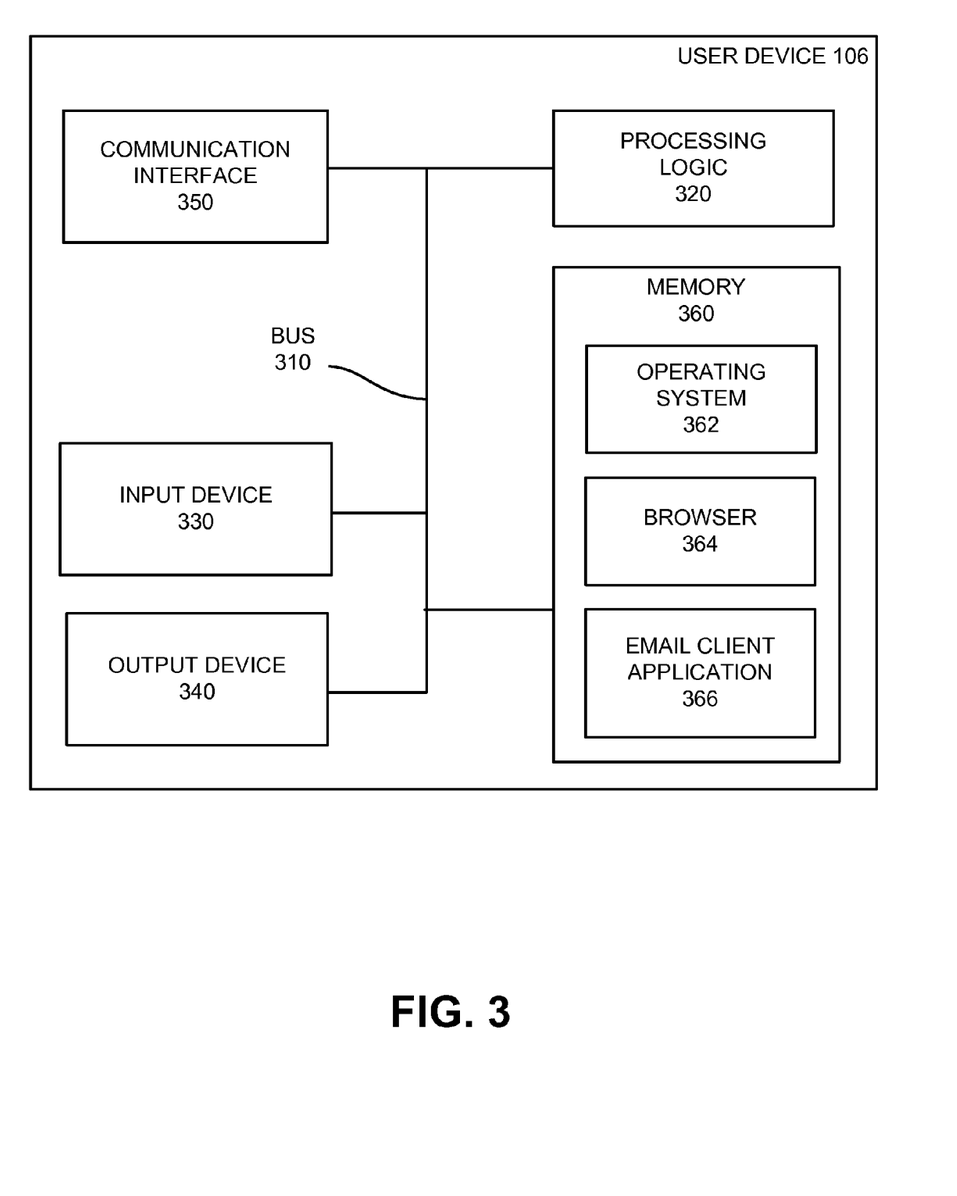
FIG. 3 is a diagram of exemplary components of a user device.

FIG. 3 is a diagram of exemplary components of device 106. As shown in FIG. 3, device 106 may include a bus 310, processing logic 320, an input device 330, an output device 340, a communication interface 350, and memory 360. Memory 360 may include an operating system 362, a browser 364, and an email client application 366. Device 106 may include other components (not shown in FIG. 3) that aid in receiving, transmitting, storing and/or processing data. Moreover, other configurations of components in device 106 are possible. Further, one or more components of client device may be remotely located from each other.

Processing logic 320 may include a processor, microprocessor, an application-specific integrated circuit (ASIC), or a field-programmable gate array (FPGA). Processing logic 320 may include circuits, data structures, or software programs to control operation of device 106 and its components.

Input device 330 may include mechanisms for inputting information into device 106. Input device 330 may include microphone 212 to receive audio signals, control keys 208 or keypad 210 to permit data and control commands to be input. Output device 340 may include one or more devices for outputting information from device 106. Output device 340 may include speaker 204 to output audio signals, display 206 to output visual information, or a vibrator (not shown) to alert a user.

Input device 330 and output device 340 may allow the user of device 106 to receive a menu of options and make selections from the menu of options. The menu may allow the user to select various functions or modes associated with applications executed by device 106. For example, as mentioned above, control keys 208 may include "soft keys" that may perform the functions indicated on display 206. Input device 330 and output device 340 may allow the user to activate a particular mode or application, such as a mode defined by an application running in device 106.

Communication interface 350 may include, for example, a universal serial bus (USB) port for communications over a cable. Communication interface 350 may also include a transmitter that may convert baseband signals from processing logic 320 to radio frequency (RF) signals and/or a receiver that may convert RF signals to baseband signals. Alternatively, communication interface 350 may include a transceiver to perform functions of both a transmitter and a receiver. Communication interface 350 may include or be coupled to an antenna for transmission and reception of the RF signals. Communication interface 350 may incorporate the Bluetooth standard.

Memory 360 may include a hard-disk drive (HDD), a random-access memory (RAM), a read-only memory (ROM), flash memory, a removable memory, and/or another type of memory to store data and/or instructions that may be used by processing logic 320 (e.g., any type of a computer-readable medium). As mentioned above, memory 360 may store operating system 362, browser 364, and email client application 366. Operating system 362 may provide a software platform on top of which application programs, such as browser 364, can run. Browser 364 may allow a user to interact with web resources at websites or servers, such as server 112. A user may use browser 364 to submit universal resource indicator (URI) requests to network 110 and/or server 112. Email client application 366 may allow the user of device 106 to send and receive email. Memory 360 may include other application programs not shown in FIG. 3.

Device 106 may perform certain operations, as described in detail below. Device 106 may perform these operations in response to processing logic 320 executing software instructions contained in a computer-readable medium, such as memory 360. A computer-readable medium may be defined as a physical or logical memory device. The software instructions may be read into memory 360 from another computer-readable medium or from another device via communication interface 350. The software instructions contained in memory 360 may cause processing logic 320 to perform processes that are described below.

Exemplary Server Module

Figure 4:
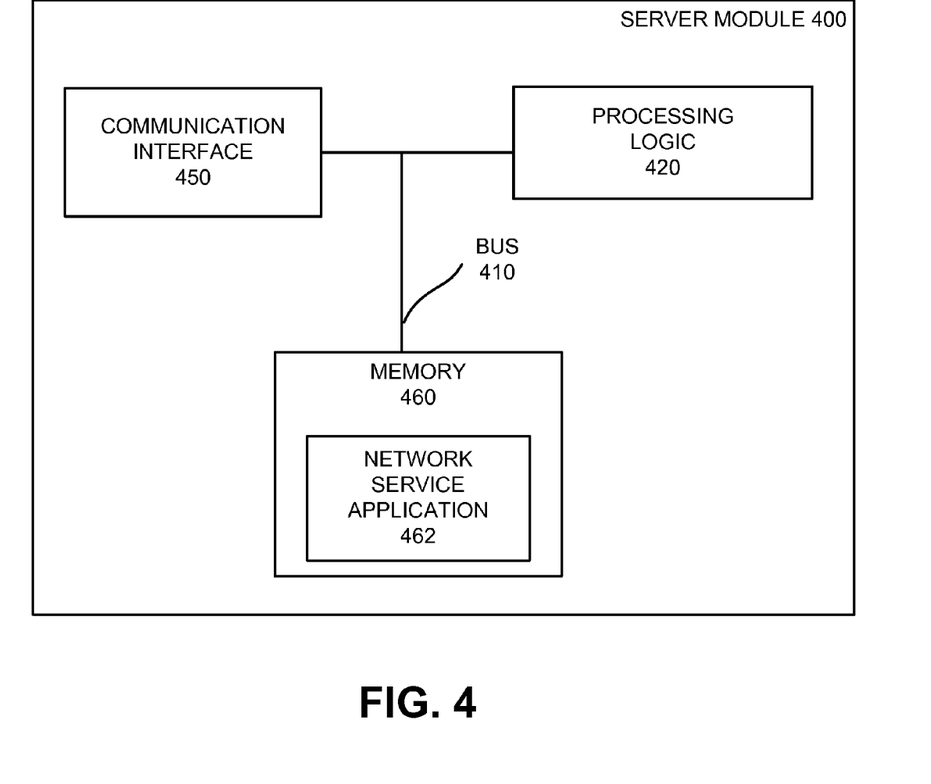
FIG. 4 is a block diagram of exemplary components of a server module.

FIG. 4 is a block diagram of exemplary components of a server module 400 (module 400). Server 112 may include one or more server modules 400, e.g., a "rack" of server modules, such as module 400. Tower 108-x may also include one or more server modules, such as server module 400.

Server module 400 may include a bus 410, processing logic 420, a communication interface 450, and a memory 460. Memory 460 may include a network service application 462. Server module 400 may include other components (not shown) that aid in receiving, transmitting, and/or processing data. Moreover, other configurations of components in server module 400 are possible. Further, one or more components of server module 400 may be remotely located from each other.

Bus 410 may include a path that permits communication among the components of server module 400. Processing logic 420 may include any type of processor or microprocessor (or groups of processors or microprocessors) that interprets and executes instructions. In other embodiments, processing logic 420 may include an ASIC, a FPGA, or the like.

Communication interface 450 may include any transceiver-like mechanism that enables server module 400 to communicate with other devices and/or systems. Communication interface 450 may include a GGSN that may act as a gateway between a GPRS wireless data network and network 110. Communication interface 450 may include a port that may allow module 400 to communicate over a dedicated link, such as interconnect 111 from roaming network environment 104 to home network environment 102.

Memory 460 may include a RAM or another type of dynamic storage device that may store information and instructions for execution by processing logic 420; a ROM device or another type of static storage device that may store static information and instructions for use by processing logic 420; and/or some other type of magnetic or optical recording medium and its corresponding drive, e.g., a HDD, for storing information and/or instructions.

As mentioned above, memory 460 may store data service application 462, for example. Data service application 462 may receive data requests from device 106 (e.g., through towers 108-3 and 108-4) and may decide whether to pass the request to network 110 through the Internet or to home network environment 102 through interconnect 111, for example.

Server module 400 may perform certain operations, as described in detail below. Server module 400 may perform these operations in response to processing logic 420 executing software instructions contained in a computer-readable medium, such as memory 460. The software instructions may be read into memory 460 from another computer-readable medium or from another device via communication interface 450. The software instructions contained in memory 460 may cause processing logic 420 to perform processes that are described below.

Exemplary Processes

Figure 5:
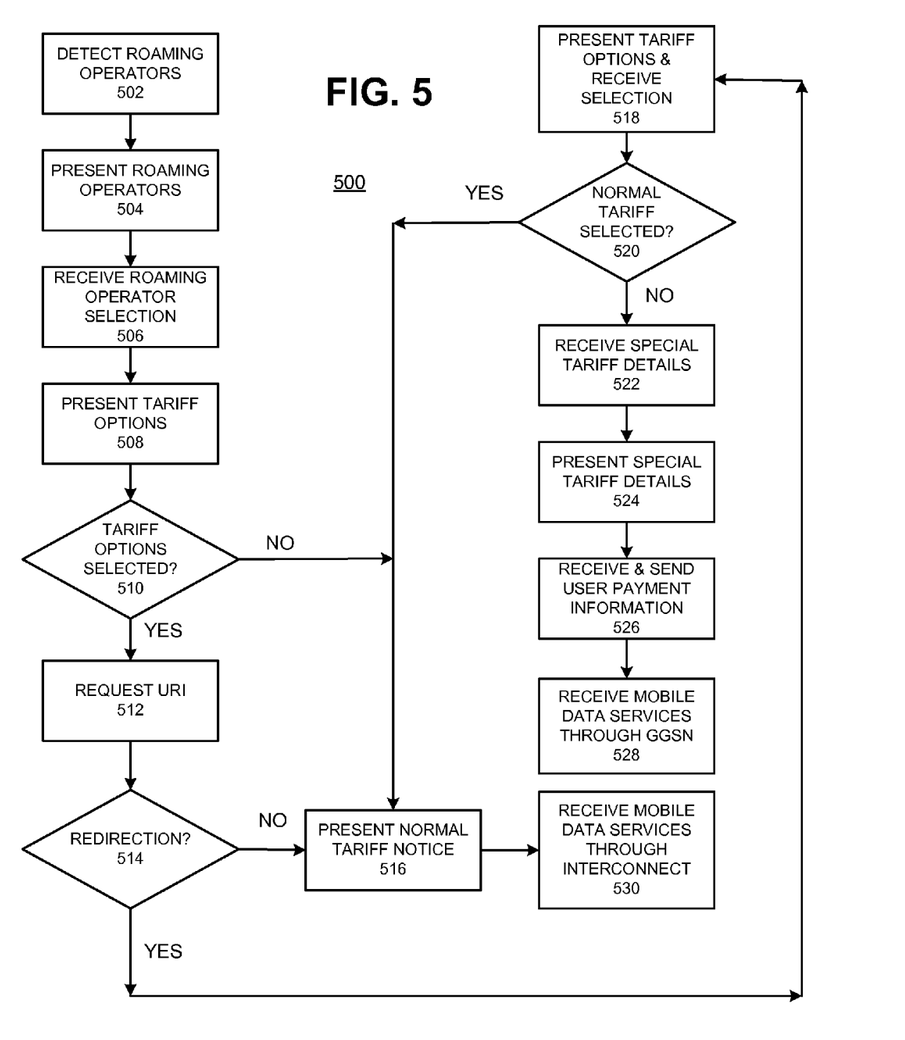
FIG. 5 is a flowchart of an exemplary process 500 for providing data services in a roaming network.

FIG. 5 is a flowchart of a process 500 for a data service in a roaming network. In one embodiment, process 500 may run in device 106. In another embodiment, process 500 may be run in a device other than device 106 or process 500 may be run in a distributed manner among a number of the devices in environment 100.

Process 500 may begin when a user (e.g., a tourist on vacation) arrives in roaming network environment 104 (e.g., Sweden) from home network environment 102 (e.g., Germany) after crossing body of water 103 (e.g., the Baltic Sea). Having just arrived in Sweden, the German tourist, e.g., the user, may turn on device 106 and activate a data service, such as browser application 364 or email client application 366. Roaming operators may be detected (block 502). For example, device 106 may be in communication with towers 108-1, 108-2, 108-3, and 108-4 (and possibly others) and may detect the following roaming operators: Telia, Comviq, Telnor SE, and 3 SE. In this example, the German tourist's home operator in home network environment 102 may not provide service in Sweden and, thus, may not be detected by device 106.

Figure 6A:
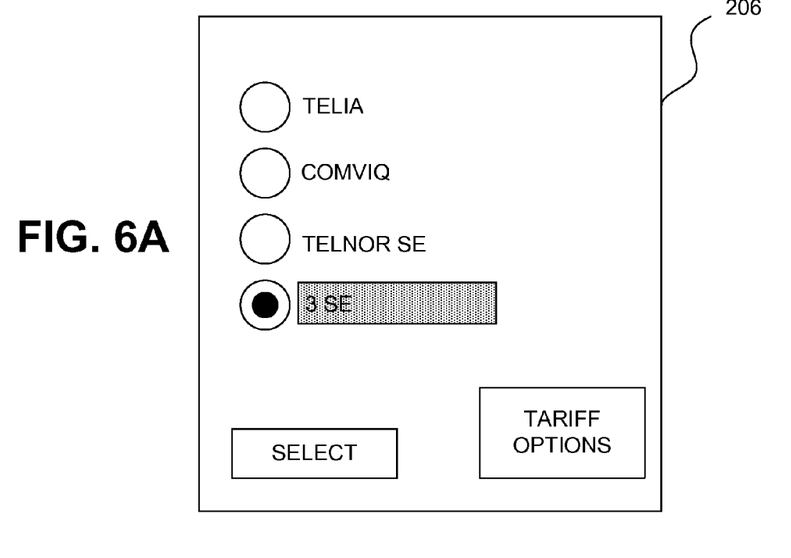
FIGS. 6A, 6B, 7A, 7B, 8A, and 8B are block diagrams of exemplary user interfaces.

The detected roaming operators (from block 502) may be presented to the user (block 504). FIG. 6A is a block diagram of an exemplary user interface presenting roaming operators to the user. As shown in FIG. 6A, the roaming operators may be presented to the user on display 206 of device 106 and may include Telia, Comviq, Telnor SE, and 3 SE. Display 206 may not display the user's home operator because, as stated above, his home operator may not provide service in Sweden. As a result, the German tourist may select a roaming operator from among those presented to him via display 206.

A roaming operator selection may be received (block 506). A shown in FIG. 6A, the user may select roaming operator 3 SE, for example, by highlighting "3 SE" and pressing the SELECT button. Highlighting in FIG. 6A is shown by a shaded box. Pressing the SELECT button may include touching display 206 or pressing the soft key associated with the displayed SELECT button. The selection of "3 SE" in FIG. 6A is indicated by a bullet to the left of the operator name.

The German tourist may be curious as to the tariff (e.g., rate) for using the selected roaming operator and may desire more information about the tariffs or rates before continuing. For example, the tourist may want to know whether the selected roaming operator has "special" tariffs or just the "normal" tariff. The normal tariff may be the tariff prearranged between the selected roaming operator and the home operator, if any. The special tariff may be a tariff that the roaming operator may offer the user independent of the home operator. A tariff options notice may be presented (block 508). As shown in FIG. 6A, the button TARIFF OPTIONS may appear in the lower right hand corner of display 206. If the user selects tariff options (block 510: YES), e.g., by pressing the TARIFF OPTIONS button, then process 500 may move to block 512 to determine the tariff options for the selected roaming operator to display them to the user.

A URI request may be sent (block 512). For example, device 106 may send a URI request to the tower 108-x associated with the selected roaming operator (e.g., tower 108-3 associated with 3 SE). Such a URI request, for example, may include "roamingoperatordataplan.com." Instead of retrieving and serving the requested URI to device 106, however, the roaming operator may instead redirect device 106 to a different URI, e.g., "tariff.roamingoperator.com." If a redirection is detected (block 514: YES), this may indicate that the selected roaming operator provides a special tariff as well as a normal tariff, both of which may be provided to the user.

Figure 6B:
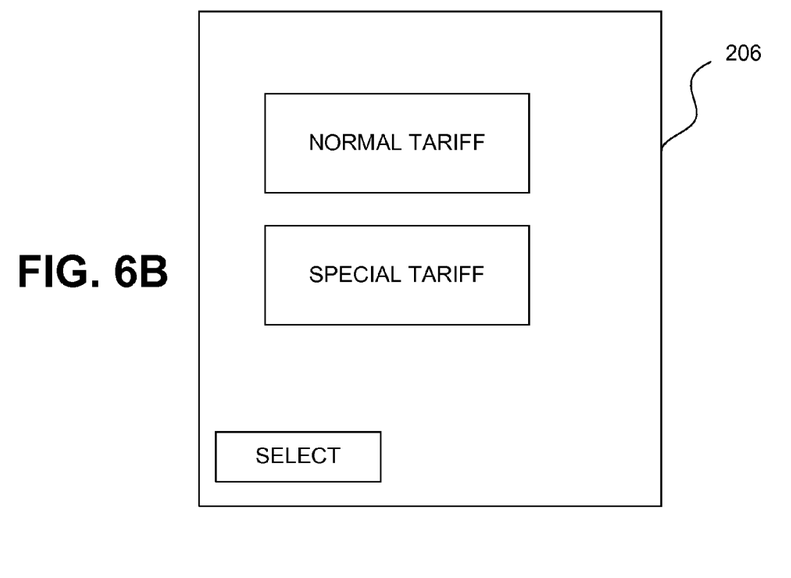
Figure 7A:
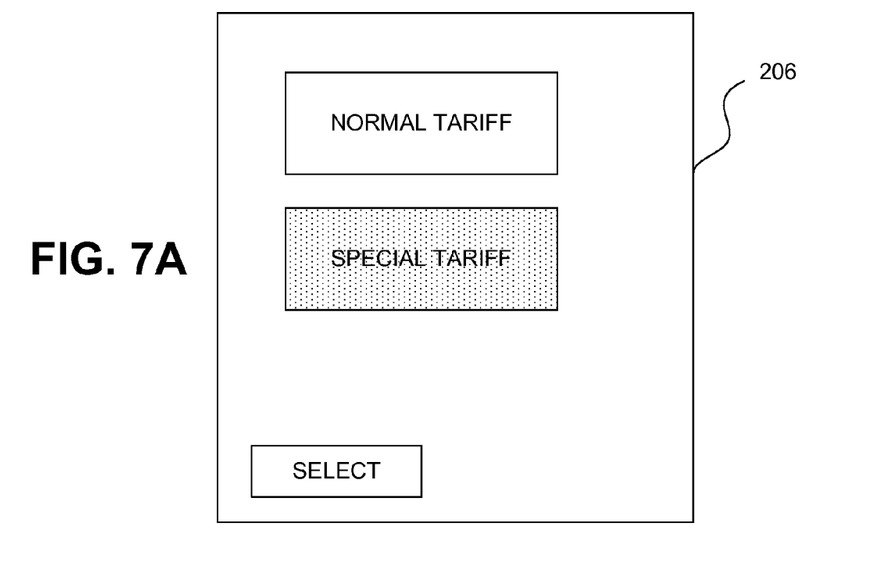
Figure 7B:
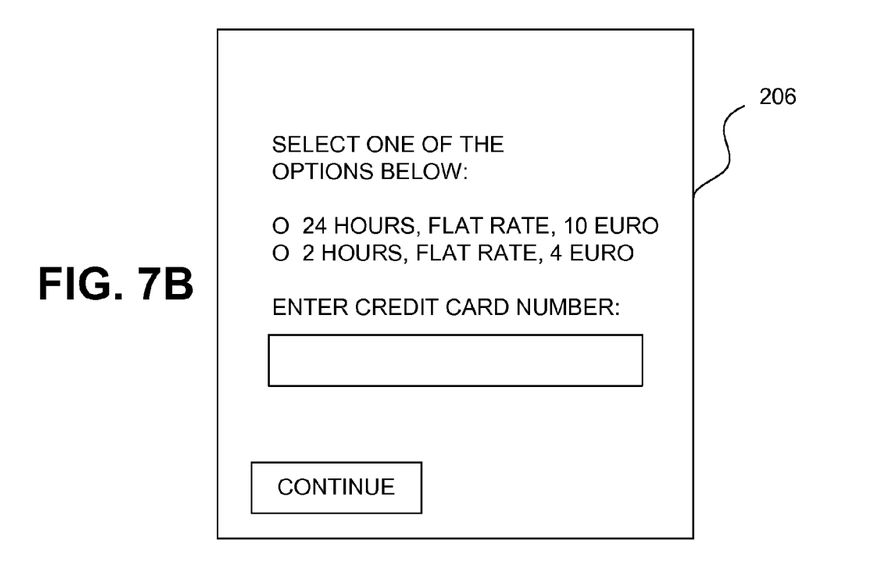

A special tariff or normal tariff option may be presented to the user and a selection may be received (block 518). As shown in FIG. 6B, display 206 may include a NORMAL TARIFF button and a SPECIAL TARIFF button. The user may highlight either the NORMAL TARIFF or SPECIAL TARIFF button and press the SELECT button. The tourist may be curious as to what the special tariffs are and, as shown in FIG. 7A, the SPECIAL TARIFF button may be highlighted for selection. If the user selects the special tariff (block 520: NO), then special tariff information may be received (block 522). In this example, device 106 may request the details of the special tariff from the selected roaming operator (e.g., 3 SE). The special tariff details may be presented to the user (block 524). As shown in FIG. 7B, detailed information regarding the special tariff is presented, e.g., 24 hours of data service for 10 Euros or 2 hours of data service for 4 Euros.

If the tourist is happy with these special tariffs, then he may wish to select and pay for one of the special tariffs. Payment information may be received and sent to the selected roaming operator (block 526). As shown in FIG. 7B, display 206 may provide a field for entering a credit card number, which may be sent to the selected roaming operator along with a selection of the plan. In one embodiment, credit card information may be stored in device 106 and transmitted to roaming operator when requested by the user. Mobile data services may be received (block 528) through a GGSN. For example, referring to FIG. 1, device 106 may request a data service from tower 108-3, which may pass the request to tower 108-4, which may pass the request to server 112, which may pass the request through a GGSN (included in server 112) to the Internet (in network 110) via link 114. If the user selects 24 hours of data service for 10 Euros, then the user may be able to surf the web, read email, etc., for 24 hours and be charged 10 Euros. In this embodiment, the roaming operator may provide data services independent of the tourist's home operator. In another embodiment, the roaming operator may provide some data services independent of the home operator, but may also provide some data services that are not independent of the home operator, as described below.

Figure 8A:
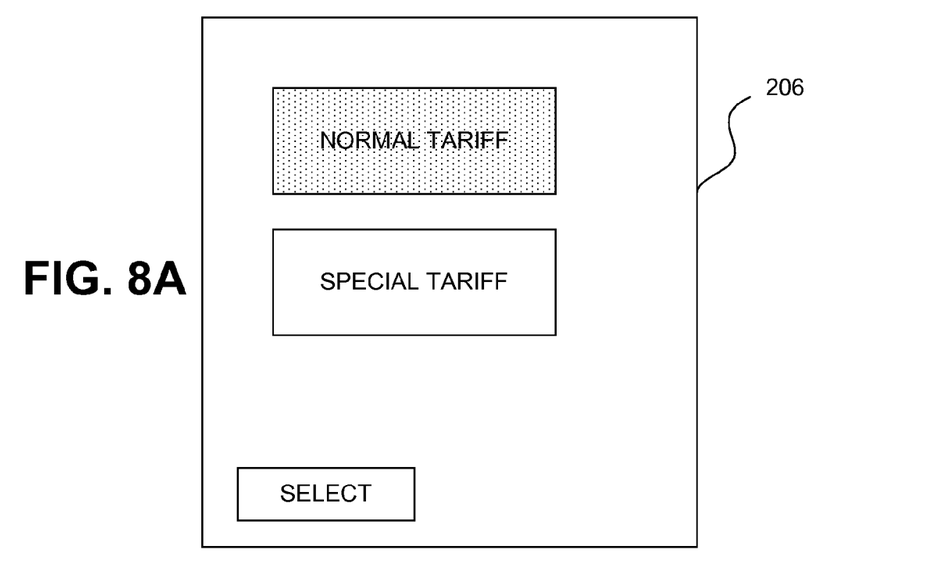

Returning to block 520, the tourist may not be interested in a special tariff and may wish to have the normal tariff applied. If the user selects the normal tariff (block 520: YES), then the normal tariff notice may be presented to the user. As shown in FIG. 8A, the NORMAL TARIFF button may be highlighted for selection. If the user selects the normal tariff (block 520: YES), then the normal tariff notice shown in FIG. 8B may be displayed to the user on display 206. Mobile data services may be received by device 106 through an interconnect (block 530) between the selected roaming operator and the home operator. For example, referring to FIG. 1, device 106 may request a data service from tower 108-3, which may pass the request to tower 108-4, which may pass the request to tower 108-6 through interconnect 111 to the home operator in home network environment 102. In this example, tower 108-6 may then pass the request to the Internet through a GGSN (not shown) in tower 108-6 over link 114. The user of device 106 may surf the web, read email, etc., and have the normal fees applied.

Figure 8B:
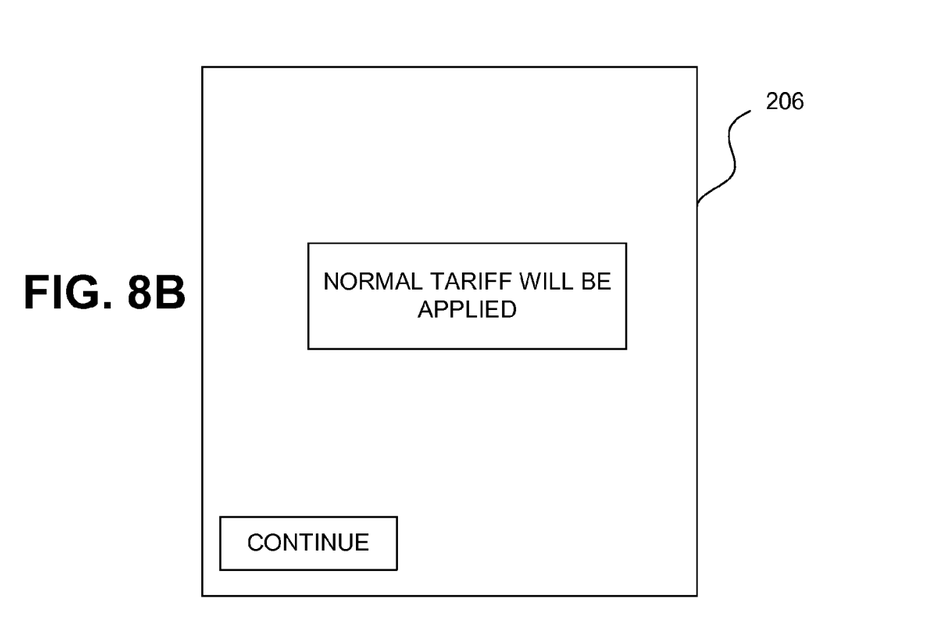

Returning to block 514 (e.g., after tariff option is selected (block 510) and a URI is requested (block 512)), if a redirection is not detected (block 514: NO), then device 106 may determine that the roaming operator may not have a special tariff. In this situation, a normal tariff notice may be presented (block 516). For example, as shown in FIG. 8B, a notice that a normal tariff will be applied to the data service will be displayed on display 206. Mobile data services may be received by device 106 through an interconnect (block 530) between the selected roaming operator and the home operator. For example, referring to FIG. 1, device 106 may request a data service from tower 108-3, which may pass the request to tower 108-4, which may pass the request to tower 108-6 through interconnect 111 to the home operator in home network environment 102. In this example, tower 108-6 may then pass the request to the internet through a GGSN (not shown) in tower 108-6 over link 114. The user of device 106 may surf the web, read email, etc., and have the normal fees applied.

Returning to block 510, the tourist may not be interested in tariff options at all. In this case, if the user does not select tariff options (block 510: NO), then the normal tariff notice may be presented to the user (block 516). For example, as shown in FIG. 8B, a notice that a normal tariff will be applied to the data service will be displayed on display 206. Mobile data service may be received by device 106 through interconnect 111 (block 530) between the selected roaming operator and the home operator. For example, referring to FIG. 1, device 106 may request a data service from tower 108-3, which may pass the request to tower 108-4, which may pass the request to tower 108-6 through interconnect 111 to the home operator in home network environment 102. In this example, tower 108-6 may then pass the request to the Internet through a GGSN (not shown) in tower 108-6 over link 116. The user of device 106 may surf the web, read email, etc., and have the normal fees applied.

In addition to the data services provided by the roaming operator, the roaming operator may also provide voice services that are not independent of the home operator. For example, the roaming operator may authenticate device 106 with the home operator. After authentication, roaming operator may provide voice services (e.g., placing and receiving phone calls) to device 106. The roaming operator may subsequently receive payment from the home operator for the voice services provided to device 106.

Figure 9:
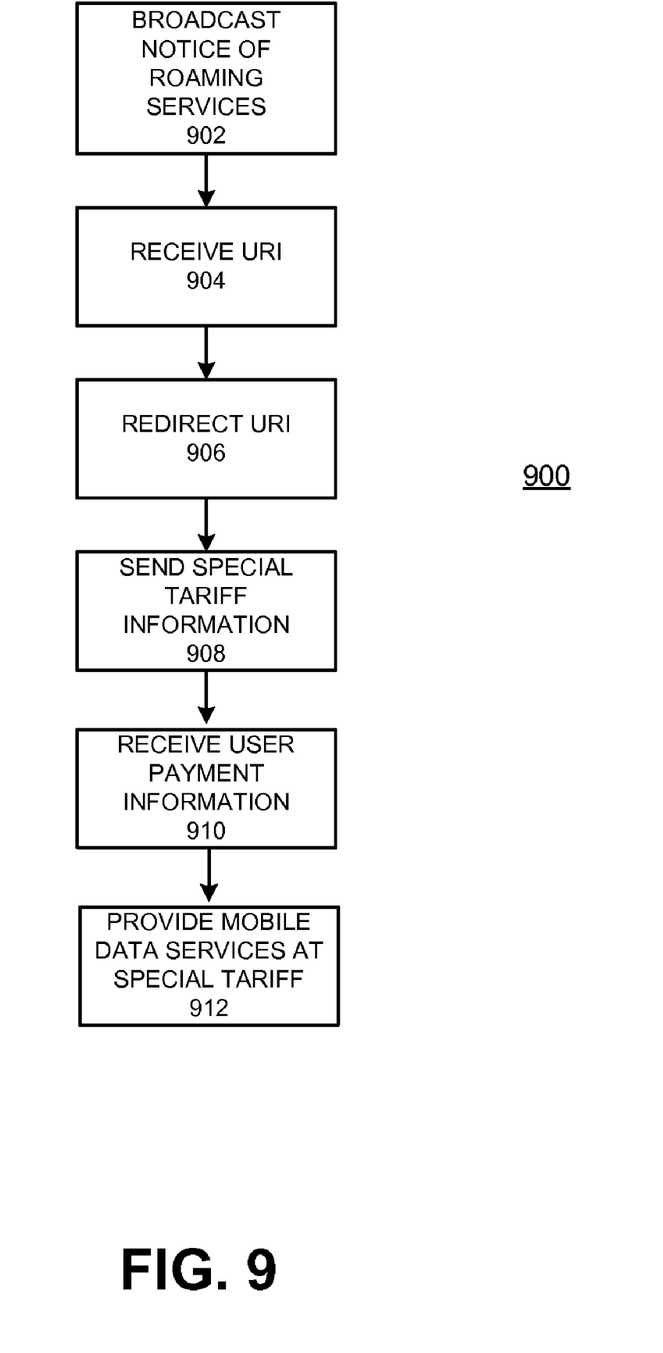
FIGS. 9 and 10 are flowcharts of exemplary processes for providing data services in a roaming network.

FIG. 9 is a flowchart of an exemplary process 900 for data service in a roaming network. Process 900 may begin before the German tourist, e.g., the user of device 106, crosses the Baltic Sea and arrives in roaming network environment 104, e.g., Sweden, turns on device 106, and activates a data service. Process 900 may be performed in one or more of towers 108-x. In another embodiment, process 900 may be performed in a distributed manner among, for example, device 106, towers 108 and server 112.

The roaming operators may wish to broadcast their roaming services to users, such as the German tourist in this example. Notice of roaming services may be broadcast (block 902). For example, the operators that provide roaming data plans, e.g., Telia, Comviq, Telnor SE, and 3 SE may broadcast this service feature.

A URI request may be received (block 904). For example, when the user of device 106 selects a roaming operator, device 106 may request a URI (see block 512 above), which is received by a tower 108-x. The URI may include, for example, "roamingoperatortariff.com." The roaming operator may understand this URI request to be a request for details of the special tariff. A redirection may be provided (block 906). For example, tower 108-x may redirect device 106 to "tariff.roamingoperator.com." Special tariff information may be sent (block 908). The redirected URI may include details of the special tariff. As discussed above with respect to block 518 and FIG. 7B, details of the special tariff may be displayed on display 206 for the user. User payment information may be received (block 910). As discussed above with respect to FIGS. 5 and 7B, the roaming operator (e.g., through tower 108-x) may receive user payment information, such as a credit card number and a special tariff selection (e.g., 24 hours for 4 Euro). Mobile data services may be provided (block 912). Having received the credit card information, and charged the credit card, e.g., for 10 Euros, the roaming operator may provide the data services. In one embodiment, for example, the roaming operator may provide data services to device 106 via a GGSN in server 112 coupled to network 110 via link 114 independent of the home operator.

In one embodiment, not all data services may be provided by the roaming operator independent of the home operator, however. For example, in one embodiment, a roaming operator may not be able to process SMS (simple messaging system) or MMS (multi-media messaging system) messages through a GGSN. Instead, the roaming operator may send SMS and MMS messages through interconnect 111.

Figure 10:
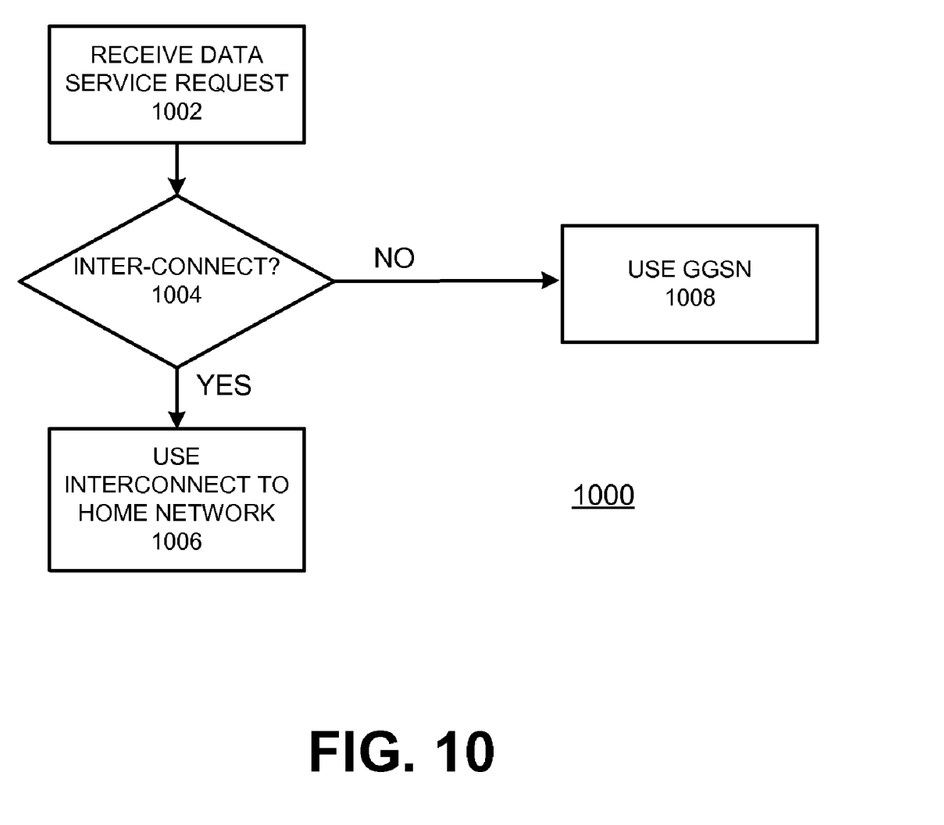

FIG. 10 is a flowchart of an exemplary process 1000 for providing data service in a roaming network. Process 1000 may begin, for example, after a user, e.g., the German tourist, has selected a roaming operator and a special tariff. A request for a data service may be requested (block 1002) by device 106. If the data service requires an inter-connect to home network environment 102, then a direct connection to home network environment 102 may be used to provide the data service. For example, if an SMS or MMS message is received by the roaming network, the roaming network may use dedicated interconnection 111 to send the MMS or SMS to the home operator. If no inter-connect is required, a GGSN may be used. For example, if a world-wide web (WWW) universal resource locater (URL) is requested, the roaming network may use the GGSN portion of server 112 to connect to the Internet (e.g., network 110) via link 114 to provide the requested data service.

In one embodiment, the roaming operator may provide data services independent of the home operator. As such, the roaming operator may not find it necessary to authenticate the user of device 106 before providing data services to the user device 106, e.g., the roaming operator may not find it necessary to check with the home operator to verify that device 106 indeed has an account with the home operator. Instead of authenticating device 106 with the home operator, the roaming operator may receive payment by credit card. In this example, the roaming operator may charge the credit card and receive payment without authenticating device 106 with the home operator. Thus, for example, the user may use a SIM (subscriber identity module) card that is not associated with any home operator, but may still receive services from a roaming operator.

In one embodiment, the roaming operator may provide data services, but no voice service. In another embodiment, however, telephony service may be provided over the data network by Voice over Internet Protocol (VoIP), for example. As the term is used herein, however, "voice services" may exclude telephony services provided over a data service, e.g., VoIP.

In one embodiment, the roaming operator may compete directly with WiFi services that require payment and provide data services to user devices, regardless of a home service provider associated with the user device. In one embodiment, latency of data transmission may be reduced as a result of not transmitting data to the home operator through an interconnect.

In one embodiment, device 106 may be in an area serviced by the home operator, but the user of device 106 may view and select operators other than the home operator to provide data services at a special tariff.

Conclusion

Accordingly, embodiments described herein may allow for a roaming operator to provide data services to a mobile device independent of the home operator. One or more embodiments describe herein may allow for the roaming operator to provide data services to the mobile device at a flat rate, e.g., a flat tariff. One or more embodiments described herein may allow for a roaming operator to pass traffic through a GGSN rather than sending data back to the home operator and the roaming operator. One or more embodiments described herein may allow a roaming operator to decide whether to pass traffic through a GGSN or through an interconnect to the home operator through a interconnect between the home operator and the roaming operator.

As used herein, the term "keypad" may include control keys 208, keypad 210, or a touch sensitive display for inputting information by the user.

The foregoing description of embodiments provides illustration and description, but is not intended to be exhaustive or to limit the invention to the precise form disclosed. Modifications and variations are possible in light of the above teachings.

Although exemplary processes 500, 900, and 1000 show blocks in a particular order, these processes are not limited to the blocks being in this particular order. For example, while series of blocks have been described with regard to some figures, the order of the blocks may be modified in other embodiments. Further, non-dependent acts may be performed in parallel.

It should be emphasized that the term "comprises/comprising" when used in the this specification is taken to specify the presence of stated features, integers, steps or components but does not preclude the presence or addition of one or more other features, integers, steps, components or groups thereof.

It will be apparent that aspects of the invention, as described above, may be implemented in many different forms of software, firmware, and hardware in the embodiments illustrated in the figures. The actual software code or specialized control hardware used to implement aspects consistent with principles of the invention is not limiting of the invention. Thus, the operation and behavior of the aspects were described without reference to the specific software code—it being understood that one would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    detecting a roaming operator by a mobile communications device, where the mobile communications device is associated with a home operator;
    receiving a data service, by the mobile communications device, provided by the roaming operator independent of the home operator;
    sending information, from the mobile communications device, to the roaming operator for the roaming operator to authenticate the mobile communications device with the home operator;
    receiving a voice service, by the mobile communications device, provided by the roaming operator based on the authentication by the roaming operator of the mobile communications device with the home operator;
    determining whether the roaming operator provides the data service independent of the home operator, where determining whether the roaming operator provides the data service independent of the home operator includes:
        requesting a universal resource indicator (URI) from the roaming operator, and
        detecting a redirection to a different URI; and
    providing to a user of the mobile communications device an option to receive the data service independent of the home operator or not independent of the home operator.

2. The method of claim 1, where detecting a roaming operator includes detecting a plurality of roaming operators, the method further comprising:
    providing to a user of the mobile communications device a list of the plurality of roaming operators; and
    receiving a selection of one of the plurality of roaming operators, where receiving the data service includes receiving the data service from the selected roaming operator.

3. The method of claim 1, further comprising:
sending payment information from the mobile communications device to the roaming operator for payment for the data service.

4. The method of claim 1, where receiving the data service includes receiving a first data service, the method further comprising:
receiving a second data service from the roaming operator, where the roaming operator interconnects with the home operator to provide the second data service.

5. The method of claim 4, where the second data service is one of a simple message system (SMS) message or a multi-media message system (MMS) message.

6. A method comprising:
receiving a request from a mobile communications device for rate information for a data service;
sending the rate information for the data service to the mobile communications device from a roaming operator, where the mobile communications device is associated with a home operator;
receiving authentication information from the mobile communications device;
authenticating the mobile communications device with the home operator;
providing the data service to the mobile communications device by the roaming operator independent of the home operator;
providing a voice service to the mobile communications device by the roaming operator based on the authentication by the roaming operator of the mobile communications device with the home operator;
receiving a request, from the mobile communications device, for a universal resource indicator (URI); and
redirecting the mobile communications to a different URI.

7. The method of claim 6, further comprising:
receiving payment information from the mobile communications device for payment for the data service.

8. The method of claim 6, where providing the data service includes providing a first data service, the method further comprising:
providing a second data service to the mobile communications device, where the roaming operator interconnects with the home operator to provide the second data service.

9. The method of claim 8, where the second data service is one of a simple message system (SMS) message or a multi-media message system (MMS) message.

10. The method of claim 9, further comprising:
determining whether to provide the second data service by interconnecting with the home operator based on a type of the second data service.

11. A mobile communications device associated with a home operator, the device comprising:
a transceiver to transmit and receive communication signals to and from a roaming operator; and
a processor, coupled to the transceiver, to:
process a data service from the roaming operator independent of the home operator;
provide information to the roaming operator for the roaming operator to authenticate the mobile communications device with the home operator;
process a voice service from the roaming operator based on the authentication by the roaming operator of the mobile communications device with the home operator;
determine whether the roaming operator provides the data service independent of the home operator;
provide to a user of the mobile communications device an option to receive the data service independent of the home operator or not independent of the home operator;
request a universal resource indicator (URI) from the roaming operator; and
detect a redirection to a different URI.

12. The device of claim 11, where the transceiver receives communication signals from a plurality of roaming operators, the device further comprising:
a display to provide the user with a list of the plurality of roaming operators; and
a user interface to receive a selection of one of the plurality of roaming operators, where the processor processes the data service from the selected roaming operator.

13. The device of claim 11, where the processor sends payment information to the roaming operator for payment for the data service.

14. The device of claim 11, where the processor receives a second data service from the roaming operator, where the roaming operator interconnects with the home operator to provide the second data service.

15. The device of claim 14, where the second data service is one of a simple message system (SMS) message or a multi-media message system (MMS) message.

16. A method comprising:
detecting a roaming operator by a mobile communications device, where the mobile communications device is associated with a home operator;
determining whether the roaming operator provides a data service independent of the home operator, where determining whether the roaming operator provides the data service independent of the home operator includes:
requesting a universal resource indicator (URI) from the roaming operator, and
detecting a redirection to a different URI;
providing to a user of the mobile communications device an option to receive a data service independent of the home operator or dependent on the home operator;
receiving the data service, by the mobile communications device, provided by the roaming operator independent of the home operator;
sending information, from the mobile communications device, to the roaming operator for the roaming operator to authenticate the mobile communications device with the home operator;
receiving a voice service, by the mobile communications device, provided by the roaming operator based on the authentication by the roaming operator of the mobile communications device with the home operator; and
sending payment information from the mobile communications device to the roaming operator for payment for the data service.

* * * * *